Figure 1:
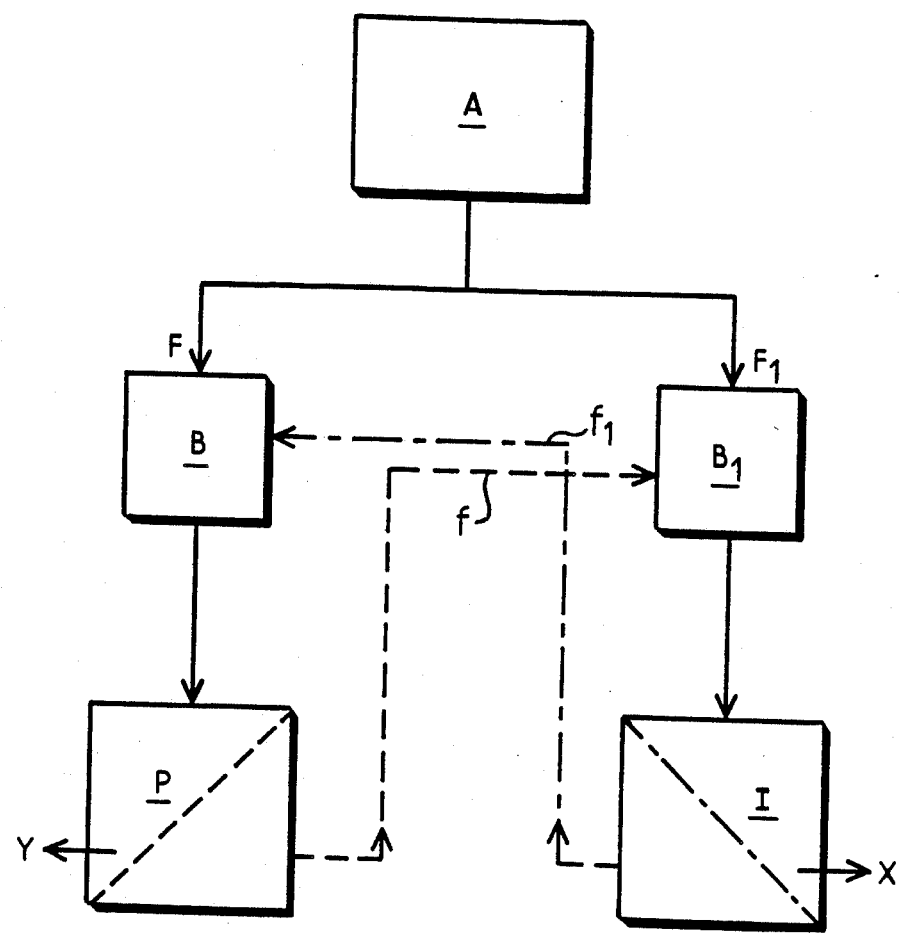

United States Patent [19]

Dick et al.

[11] Patent Number: 4,806,366
[45] Date of Patent: Feb. 21, 1989

[54] PROCESS FOR ADJUSTING THE ALCOHOL CONTENT OF WINES OR ALCOHOLIC BEVERAGES AND INSTALLATION FOR ITS IMPLEMENTATION

[75] Inventors: Richard Dick, Paris; Guy Moulin, Saint Gely du Fesc; Pierre Galzy, Montpellier, all of France

[73] Assignee: Institut National de Recherche Chemique Appliquee, Paris, France

[21] Appl. No.: 878,528

[22] Filed: Jun. 20, 1986

[30] Foreign Application Priority Data

Jul. 5, 1985 [FR] France ............................ 85 10316

[51] Int. Cl.$^4$ .................. C12G 1/00; C12C 11/04
[52] U.S. Cl. ...................................... 426/15; 426/16; 426/490; 210/641; 210/651
[58] Field of Search .................... 426/490, 16, 15; 210/651, 641

[56] References Cited

FOREIGN PATENT DOCUMENTS 0078226 of 1982 European Pat. Off. .
0089893 of 1983 European Pat. Off. .
0025280 3/1978 Japan .................................. 210/641

OTHER PUBLICATIONS

J. P. Choudhury et al, "Separation of Ethanol from Ethanol-Water Mixture by Reverse Osmosis", *Biotechnology and Bioengineering*, vol. 27, No. 7(1985) Wiley & Sons, NY, pp. 1081-1084.

M. H. V. Mulder et al.: "Ethanol-Water Separation by Pervaporation" Chemical AB., vol. 100, No. 11, Mar. 1984, pp. 424-425, Abstract No. 84147x, Columbus, Ohio US, & J Membr. Sci. 1983, 16, 269-84.

*Primary Examiner*—Peter Chin
*Assistant Examiner*—Thi Dang
*Attorney, Agent, or Firm*—Browdy & Neimark

[57] ABSTRACT

The invention concerns a product for adjusting the degree of alcohol of wines or alcoholic beverages. According to the invention, this process consists in resorting to two coupled reverse osmosis systems each comprising a tank for supplying the product to be processed upstream from a reverse osmosis cell, in equipping the two reverse osmosis cells P and I with membranes with a distinctly different permeability to ethanol, in withdrawing the permeate originating from said cell P, in sending it into said supply reservoir upstream from said cell I, in withdrawing the permeate originating from said cell I and in sending it into the supply tank upstream from cell P, whilst recovering the corresponding concentrates X and Y.

8 Claims, 2 Drawing Sheets

PROCESS FOR ADJUSTING THE ALCOHOL CONTENT OF WINES OR ALCOHOLIC BEVERAGES AND INSTALLATION FOR ITS IMPLEMENTATION

The present invention concerns a process for adjusting the degree of alcohol in wines or alcoholic beverages and in installation for its implementation.

Various processes have already been described in the literature for processing a wine by means of ultra-filtration or reverse osmosis membranes in order to produce a beverage with a lower or higher alcoholic content.

To make a beverage with a lower degree of alcohol, the known processes generally consist in suitably diluting a reconstitution product obtained by bringing together the products resulting from consecutive fractionations made with a view to recovering in the initial product the elements considered as lying at the origin of the gustatory qualities.

For instance, the application for patent PCT No. 82 02405 proposes to make an alcoholized beverage with a low degree of alcohol by subjecting a natural alcoholic beverage to three consecutive stages of physical fractionation:

an initial ultra-filtration with a membrane with a cut-off threshold of about 10,000, next, reverse osmosis with a membrane with a cutoff threshold of about 250 on the preceding filtrate, next, evaporation in a vacuum of the filtrate from the second operation, and lastly, gathering of the concentrates from the three stages before carrying out appropriate dilution.

European Pat. No. 78 226 proposes to prepare the alcoholic beverages by recovery and valorization of the products contained in the reverse osmosis operation permeates.

The European Pat. No. 89 893 proposes to process an alcoholic beverage (mainly beer) in an intial ultra-filtration or reverse osmosis operation and then to subject the permeate from this initial operation to reverse osmosis processing on a membrane impermeable to alcohol and finally to gather together the two concentrates, and then dilute as desired.

Furthermore, a process described in French Pat. No. 2 553 292 is known enabling wine to be processed directly by reverse osmosis on a membrane impermeable to alcohol in order to obtain a wine with a higher degree of alcohol than the initial wine.

The processes the intention of which is to elaborate a wine with a lighter alcohol content all resort to a stage of dilution by water, which renders these processes unusable in many countries, where legislation forbids this. It is with this in view that European Pat. No. 78 226 proposes to make this dilution with an intermediate permeate.

Nonetheless, all the processes making it possible to obtain from an alcoholic beverage a beverage with either a lower or more concentrated alcoholic content, all take place with loss of a more or less interesting share of the raw material.

In addition, the need to commercialise wines and other alcoholic beverages leads to making cuts in order to adjust their degree of alcohol: these mixtures are decried, since they often result in loss of the originality of the products.

The present invention proposes a process for valorization of any wine, making it possible simultaneously and without any loss of raw material to make an alcohol-lightened or alcohol-enriched wine, both of which have retained their analytical qualities (apart from the ethanol concentration) and organoleptical qualities very similar to those of the initial product.

This process, which essentially consists in carrying out direct transfer of the ethanol of a fermented beverage to another one, comprises no addition of external water and also makes it possible to comply with the legislation of certain countries forbidding such additions.

More particularly, the objective of the present invention is to allow coupled adjustment of the ethanol contents of two alcoholic beverages so that the degree of alcohol of one is reduced, whilst that of the other increases and the contents of all the other constituents of these two beverages remain practically unchanged in the final product. Furthermore, the invention can be applied either to two different products, or to a single product, part of which will be concentrated in the ethanol and part of which de-alcoholized. Naturally, if necessary, all the conventional techniques of additional processing of the product can be resorted to (bonding, filtration, micro-filtration, pasteurization, cold processing etc) depending on specific data and in compliance with the existing legislation.

The production of wines with a low degree of alcohol is desired by many nutritionists, anti-alcohol leagues and also many consumers and professionals in the wine industry and trade. One of the objectives of the invention is to obtain such a product whilst retaining all the characteristics of a wine, though one with a lower ethanol content. This product could form the necessary basis for the elaboration of new beverages. Another objective is to increase and adjust the degree of alcohol of a wine or an alcoholic beverage. Such a system should make it possible to adjust the degree of alcohol of wines to the necessary level to enable them to be marketed. It could make it possible to correct during certain years the natural paucity in ethanol of a wine caused by variations in the climate. The purpose of the present invention is to achieve these two objectives conjointly in order to comply with the legislation of each country. It is also possible conjointly to make adjustments in the alcoholic degree between various wines depending on requirements and to obtain beverages of composition identical to that of a true merchant wine, except for the degree of alcohol.

Certain legislations forbid the addition of water at any time during the manufacture of these products. Accordingly, "closed" manufacturing circuits must be provided in which no water enters, and from which the wine with a low degree of alcohol and the wine concentrated in ethanol leave separately. This is the purpose sought by the present invention. It applies perfectly to the case of production of wine with a low degree of alcohol, but also is applicable to the reduction of the degree of alcohol of any fermented beverage, in particular every time legislation prohibits the use of water.

The process according to the invention is hence characterized by the fact that it consists in resorting to two coupled reverse osmosis systems, one equipped with a tank supplying the product to be processed and at least one cell equipped with at least one membrane offering a certain permeability to ethanol directly supplied by the said product to be processed and designated hereinafter by "I", and the other equipped with a tank for supplying the product to be processed and at least one cell equipped with at least one membrane offering a permeability to ethanol distinctly greater and designated hereinafter "P", in withdrawing the permeate from said cell P and in sending this permeate into said supply reservoir situated up-line from said cell I, in withdrawing the permeate from said cell I and sending this permeate into the supply tank situated up-line from cell P, whilst recovering the corresponding concentrates X and Y.

By proceeding in this manner, a balance is set up between the two systems making for enrichment in ethanol of the concentrate leaving cell I and weakening the ethanol content of the concentrate leaving cell P.

In accordance with other characteristics:

cell I is equipped with at least one membrane impermeable or offering low permeability to ethanol and cell P is equipped with at least one membrane permeable to ethanol;

yet more advantageously, the membrane of cell P is selected from amongst those offering an ethanol rejection rate of less than 10% at a pressure greater than or equal to 10 bars for an aqueous solution of ethanol of 2 to 3%, whereas the membrane of cell I is advantageously chosen from amongst membranes offering ethanol rejection rates above 50% at a pressure from 50 to 60 bars for an aqueous solution of ethanol of 2 to 3%, as those described in French Pat. No. 2 286 850;

the product to be processed in each of the two reverse osmosis systems is the same in each of the supply tanks or each of these tanks contains a different product;

the flow in the two cells I and P is adjusted to suit the flow of the membranes used and their surface area, so as to ensure variations in the degree of alcohol desired in the two cases, without any loss or addition of water or alcohol occurring.

Figure 2:
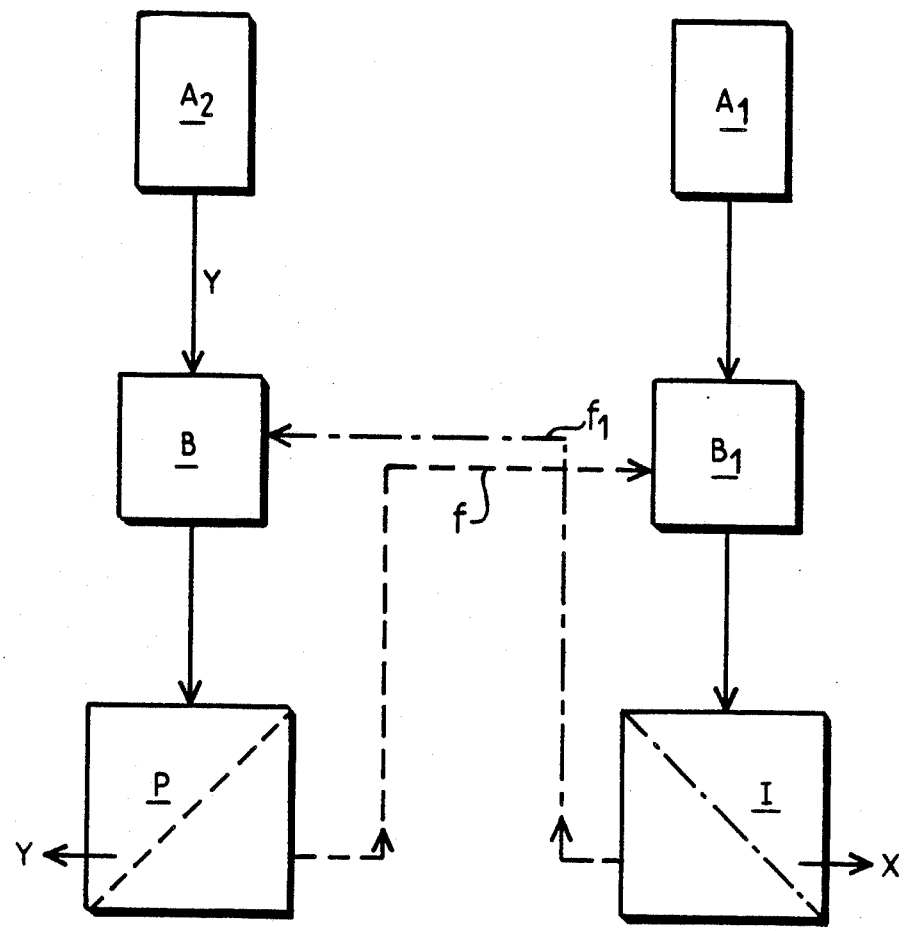

Other characteristics and advantages of the invention emerge more clearly from the description that will now follow, made with regard to the drawings appended on which:

FIG. 1 illustrates a scheme according to which the invention is applied with a single starting product to be processed; and FIG. 2 illustrates application of the process of the invention with different starting products.

Referring to these drawings, the following has been designated:

by A, $A_1$ and $A_2$ the storage and supply reservoirs of the product or products to be processed;

by B, $B_1$, the regulation tanks;

by P, a reverse osmosis cell comprising at least one membrane permeable to ethanol; and by I, a reverse osmosis cell comprising at least one membrane impermeable or of only low permeability to ethanol.

It should first of all be noted that referring to FIG. 1, the product from reservoir A supplies each of regulation tanks B, $B_1$, and is then introduced in the direction indicated by arrows F, $F_1$, firstly into cell P and secondly into cell I.

This diagram shows by means of dotted line arrow f, the flow leaving cell P. This flow is admitted into $B_1$ upstream from cell I, whereas the flow from the same cell I represented by the dashed and dotted line arrow $f_1$ is admitted into tank B upstream from cell P.

The two products X and Y directly leaving cells P and I constitute the desired products.

The transfer of the permeate must ensure water exchanges corresponding to volumes that are appreciably equal in either direction.

In the direction I towards P, i.e. $f_1$, the liquid contains ethanol at a very low concentration which depends on the flows desired and the differences in the alcohol content sought. In the direction P towards I, i.e. f, the alcohol content is appreciably the same as that of the wine processed on leaving the system P. This difference in the degree of alcohol ensures the transfer of ethanol from system P to system I.

The adjustment of the relative flows in I and P and the choice of the surface areas of the membranes of the two cells enable differences in the degree of alcohol desired to be imposed in the two systems: an increase in I and a decrease in P.

Referring to FIG. 2, the products to be processed $A_1$ and $A_2$ are introduced into the systems as previously.

The following examples given for illustrative purposes and in no way limitatory of the invention emphasize the scope and interest of the invention.

EXAMPLE 1

A red wine with a titration of 10% by volume is processed in accordance with FIG. 1 so as to obtain on one hand a wine titrating 12% by volume and on the other a product titrating 6% by volume.

One hectoliter of the product is applied, i.e. 1000° of alcohol. Reasoning in terms of alcoholic degrees, we have:

$$10Y - 6Y = 12X - 10X, \text{ i.e. } X = 2Y.$$

Now, $X + Y = 100$, whence:

$$Y = X/2 = 33.3 \text{ liters and } X = 66.6 \text{ liters.}$$

EXAMPLE 2

A red wine titrating 11% by volume is adjusted to 12% by volume and a red wine titrating 10% by volume is de-alcoholized down to 6% by volume.

In accordance with the previous equation:

$$10Y - 6Y = 12X - 11X \text{ i.e. } 4Y = X.$$

To adjust a hectoliter of wine from 10° to 6°, 4 hectoliters of wine must be adjusted from 11° to 12°.

EXAMPLE 3

A red wine, titrating 12% by volume is processed in accordance with FIG. 1, so as to obtain a wine titrating 14% by volume and a wine titrating 7% by volume.

For a hectoliter of product applied, one has 71.142 liters of concentrated wine, and 28.858 liters of de-alcoholized wine.

As an example, table 1 below indicates for this case the analysis of the starting wine, the lightened wines, and the alcoholized wines obtained and the liquids which circulate from I to P and from P to I. It should be noted that, whilst the direct modifications of the elements other than ethanol are small or zero, indirect modifications occur. In particular, the higher concentration in ethanol in the alcoholized wine will provoke progressive precipitations of potassium bitartrate during conservation and cold processing. The total and volatile acidities, the sodium and potassium contents and the organic acid contents are not given: these values will vary during conservation and processing. It should be noted that part of the volatile acid goes from P to I and not from I to P; accordingly, the result is a very slight increase in the volatility of the alcoholized wine and a drop in the volatile acidity of the lightened wine. Likewise, the lactic and succinic acids tend in very small quantities always to pass, though a little more from P to I than from I to P.

TABLE 1

|  | Starting wine | Permeate I → P | Permeate P → I | Lig. wine | Alc. wine |
|---|---|---|---|---|---|
| Alcoholmetric titration | 12 | 2 | 7.5 | 7 | 14 |
| 20/20 density | 0.99 | — | — | 0.99 | 0.99 |
| Sugars | 2 | — | — | 2 | 2 |
| Polyphenol indices | 30 | 0 | 1 | 28 | 30 |
| g/l anthocyanes | 0.130 | 0 | 0 | 0.130 | 0.130 |
| pH | 3.6 | — | — | 3.6 | 3.6 |

EXAMPLE 4

The table wine used corresponds to the analytical composition indicated in the first column of table 2. It is subjected to a treatment in accordance with the diagram of FIG. 1. The osmosing unit P is equipped with membranes permeable to ethanol of the type sold on the market under the designation "DDS ALCO 95". The osmosing unit I is equipped with membranes enabling ethanol of the type of those of Pat. No. 2,286,850 to be retained.

In accordance with FIG. 1, the permeates flow respectively from P to I and reciprocally from I to P.

The loss of ethanol at P enables a wine with a reduced degree of alcohol to be obtained (7.1°), this alcohol to be transferred from P to I and enables wine to be enriched in alcohol at the exit from I (11.5°). Analysis of the two wines obtained is indicated in table 2 (columns II and III). The pressures exerted are 45 bars in the osmosis unit P and 80 bars in the osmosis unit I.

The wines obtained (columns II and III of table 3 below) are of excellent quality. The lightened wine, as also the ethanol-enriched wine, have retained with respect to the other elements, compositions very closely approaching those of the starting product. The products obtained have the composition of a normal wine, except for the modification to the ethanol content. These products are thus of excellent quality.

The increase in the degree of alcohol, following processing, leads to the precipitation of potassium bitartrate which improves the organoleptical balance of the wine without any notable variation of the pH.

EXAMPLE 5

The wine used in this treatment was obtained by exclusive vinification of the Syrath vinestock.

Its composition is indicated in table 3 below (column I). The experimental details are the same as those of the previous experiment. The transfer of ethanol from P to I has enabled a wine with a titration of 6.85° and another wine with a titration of 12.85° to be obtained. Here again, the ethanol concentration leads to subsequent precipitation of tartar, though this in no way hinders the execution of the treatment. The analyses of the wines obtained are indicated in table 3 (columns II and III).

The same conclusions can be drawn as in the previous example concerning the analysis of the alcohol-lightened and alcohol-concentrated wines and their quality.

EXAMPLE 6

The table wine used was treated firstly by an osmosis unit (85 bars) equipped with membranes according to Pat. No. 2 286 850 for the retention of alcohol and secondly by an osmosis unit (45 bars) equipped with membranes sold on the market under the designation "DDS CAP". The diagram of FIG. 1 is again complied with. In this case it has deliberately been chosen to carry out a very slight increase in the ethanol content at the exit from I. At the exit from P, a wine with a titration of 6.9° was obtained, of excellent quality.

The CAP membrane makes for faster treatment rate than the ALCO membranes. However, the quality of the products obtained is perhaps not quite so good.

EXAMPLE 7

Using a table wine and proceeding under the conditions of example 4, or of example 6, wines with an ethanol titration of 4° were prepared.

In both cases, these wines offer a slightly excessive tannic taste. Special vinification upstream or treatments (bonding, filtration, etc) downstream appear indispensable.

TABLE 2

|  | I | II | III |
|---|---|---|---|
| Degree of alcoholic % (by vol.) | 10 | 7.1 | 11.5 |
| Polyphenol index | 22.5 | 21.0 | 20.0 |
| Anthocyane (g/l) | 0.158 | 0.133 | 0.136 |
| Folin/anthocyane index ratio | 142 | 157 | 150 |
| Total acidity in sulphuric acid (g/l) | 4.10 | 3.77 | 4.09 |
| Total acidity in tartric acid (g/l) | 6.27 | 5.76 | 6.25 |
| Volatile acidity (g/l) | 0.28 | 0.27 | 0.35 |
| Fixed acidity (g/l) | 3.52 | 3.50 | 3.74 |
| Potassium (g/l) | 0.81 | 0.78 | 0.86 |
| Colour (intensity D520 + D420) | 3.60 | 2.82 | 3.65 |
| pH | 3.40 | 3.40 | 3.45 |
| Malic acid (g/l) | 0.47 | 0.52 | 0.66 |
| Tartric acid (g/l) | 2.32 | 2.04 | 1.92 |
| Citric acid (g/l) | 0.15 | 0.14 | 0.18 |
| Lactic acid (g/l) | 2.66 | 2.48 | 2.48 |
| Succinic acid (g/l) | 0.45 | 0.46 | 0.53 |
| Adehyde (mg/l ethanal) | 44.0 | 63.4 | 56.3 |
| Esters (mg/l ethyl acetate) | 15.0 | 4.0 | 4.5 |
| Methanol (mg/l) | 172 | 95 | 110 |
| Higher alcohols (mg/l) | 363 | 289 | 235 |
| butanol-2 (mg/l) | 3.6 | 2.7 | 4.9 |
| propanol (mg/l) | 29 | 22 | 19 |
| isobutanol (mg/l) | 78 | 61 | 43 |
| N—butanol (mg/l) | 2.7 | — | — |
| isopentanol (mg/l) | 250 | 203 | 168 |

I = original wine
II = lightened wine
III = concentrated wine

TABLE 3

|  | I | II | III |
|---|---|---|---|
| Degree of alcoholic % (by vol.) | 11.65 | 6.85 | 12.85 |
| Polyphenol index | 30.0 | 27.0 | 33.0 |
| Anthocyane (g/l) | 0.22 | 0.177 | 0.20 |
| Folin/anthocyane index ratio | 136 | 152 | 165 |
| Total acidity in sulphuric acid (g/l) | 4.02 | 3.53 | 4.31 |
| Total acidity in tartric acid (g/l) | 6.15 | 5.40 | 6.59 |
| Volatile acidity (g/l) | 0.35 | 0.37 | 0.35 |
| Fixed acidity (g/l) | 3.67 | 3.16 | 3.96 |
| Potassium (g/l) | 0.88 | 0.74 | 0.94 |
| Colour (intensity D520 + D420) | 5.62 | 5.74 | 7.05 |
| pH | 3.48 | 3.40 | 3.50 |
| Malic acid (g/l) | 0.24 | 0.22 | 0.26 |
| Tartric acid (g/l) | 2.16 | 1.68 | 2.14 |
| Citric acid (g/l) | 0.13 | 0.12 | 0.14 |
| Lactic acid (g/l) | 3.2 | 2.68 | 3.4 |
| Succinic acid (g/l) | 0.43 | 0.33 | 0.37 |
| Adehyde (mg/l ethanal) | 51.0 | 54.5 | 49.3 |
| Esters (mg/l ethyl acetate) | 12.0 | 5.5 | 4.5 |

TABLE 3-continued

|  | I | II | III |
|---|---|---|---|
| Methanol (mg/l) | 108 | 120 | 69 |
| Higher alcohols (mg/l) | 271 | 1.6 | 0 |
| butanol-2 (mg/l) | 5.5 | 1.6 | 0 |
| propanol (mg/l) | 18 | 18 | 13 |
| isobutanol (mg/l) | 57 | 62 | 57 |
| N—butanol (mg/l) | — | 3.0 | 1.5 |
| isopentanol (mg/l) | 191 | 216 | 325 |

I = original wine
II = lightened wine
III = concentrated wine

Naturally, the present invention has been described only for purely explicatory purposes and in no way limitatory and any modification, particularly as regards the technical equivalences can be made to it, without leaving its context.

We claim:

1. A process for adjusting the degree of alcohol of wines or alcoholic beverages by passing the wine or alcoholic beverages through two coupled reverse osmosis cells (P) and (I), said process comprising:
   providing a first cell (P) with at least one membrane permeable to ethanol and a second cell (I) with at least one membrane impermeable or with low permeability to ethanol;
   passing a first alcoholic beverage through said first cell (P) and a second alcoholic beverage through said second cell (I);
   withdrawing a first permeate from said first cell (P) and feeding said first permeate to a first supply reservoir upstream of said second cell (I) and mixing said first permeate with said second alcoholic beverage;
   withdrawing a second permeate from said second cell (I) and sending it to a second supply tank upstream of said first cell (P) and mixing said second permeate with said first alcoholic beverage; and
   recovering concentrates (X and Y) which have not permeated through said membranes in the form of alcoholic beverages from said cells (P) and (I).

2. A process in accordance with claim 1 wherein said first and second alcoholic beverages are the same.

3. A process according to claim 1 wherein said first and second alcoholic beverages are different.

4. A process in accordance with claim 1 wherein said first and second alcoholic beverages are wines.

5. A process in accordance with claim 1 in which the membrane impermeable or of low permeability to ethanol displays an ethanol rejection rate of above 50% at a pressure ranging from 50 to 60 bars for an aqueous solution of ethanol of 2 to 3%.

6. A process in accordance with claim 1 in which the membrane permeable to ethanol displays an ethanol rejection rate of less than 10% at a pressure of over or equal to 10 bars for an aqueous solution of ethanol of 2 to 3%.

7. A process in accordance with claim 1 in which the flow in the two cells (I) and (P) is adjusted in terms of the flow of the membranes used and their surface areas, so as to ensure variations in the degree of alcohol desired in the two cases, without any loss or addition of water or alcohol occurring.

8. A process for obtaining two different wines having different alcoholic contents from a single starting wine, comprising:
   providing a first cell (P) with at least one membrane permeable to ethanol and a second cell (I) with at least one membrane impermeable or with low permeability to ethanol;
   passing a first stream of said starting wine in a first path through said first cell (P);
   passing a second stream of said starting wine through a second path to said second cell (I);
   withdrawing first permeate from said first cell (P) and feeding said first permeate to said second path upstream of said second cell and mixing said first permeate with starting wine in said second path;
   withdrawing second permeate from said second cell (I) and feeding said second permeate to said first path upstream from said first cell (P) and mixing said second permeate with starting wine in said first path; and
   recovering a first product wine having a first ethanol concentration as concentrate (Y) from said first cell, and recovering a second product wine having a second ethanol concentration as concentrate (X) from said second cell, said first and second product wines having ethanol concentrations different from said starting wine.

* * * * *